(12) United States Patent
Tanaka et al.

(10) Patent No.: US 7,042,741 B2
(45) Date of Patent: May 9, 2006

(54) PWM INVERTER CONTROL METHOD (75) Inventors: Yoshiyuki Tanaka, Fukuoka (JP);
Katsutoshi Yamanaka, Fukuoka (JP);
Eiji Watanabe, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/517,658

(22) PCT Filed: May 26, 2003

(86) PCT No.: PCT/JP03/06538

§ 371 (c)(1),
(2), (4) Date: Dec. 13, 2004

(87) PCT Pub. No.: WO03/107520

PCT Pub. Date: Dec. 24, 2003

(65) Prior Publication Data
US 2006/0067093 A1   Mar. 30, 2006

(30) Foreign Application Priority Data
Jun. 12, 2002   (JP) .............................. 2002-171395

(51) Int. Cl.
*H02M 1/12* (2006.01)
(52) U.S. Cl. .......................................... 363/41; 363/98
(58) Field of Classification Search .................. 363/40, 363/41, 42, 95, 98
See application file for complete search history.

(56) References Cited

U.S. PATENT DOCUMENTS

| 4,370,702 | A | * | 1/1983 | Shuey et al. | ................... 363/42 |
| 4,371,824 | A | * | 2/1983 | Gritter | ......................... 318/722 |
| 4,825,132 | A | * | 4/1989 | Gritter | ......................... 318/811 |
| 5,285,365 | A | * | 2/1994 | Yamato et al. | .................. 363/8 |
| 6,151,227 | A | * | 11/2000 | Mizutani et al. | .............. 363/41 |
| 6,169,670 | B1 | * | 1/2001 | Okubo et al. | .................. 363/41 |
| 6,751,105 | B1 | * | 6/2004 | Yamanaka et al. | ............. 363/41 |

FOREIGN PATENT DOCUMENTS

| JP | 9-56195 A | 2/1997 |
| JP | 9-182452 A | 7/1997 |
| JP | 11-18488 A | 1/1999 |

* cited by examiner

*Primary Examiner*—Jeffrey Sterrett
(74) *Attorney, Agent, or Firm*—Sughrue Mion, PLLC (57) ABSTRACT

It is an object of the invention to provide a PWM inverter control method capable of causing a reduction in a noise and energy saving to be consistent with each other by the reduction in a noise and the limit of the number of switching operations.

The invention provides a 2-level PWM inverter control method, in which switching of switching units connected in series is limited by setting the number of switching operations and a timing to output an optional voltage in order not to converge a frequency component of a noise caused by the switching and setting a lower limit to the number of switching operations in order to prevent the number of switching operations from being excessively decreased in that case when an operation frequency of an inverter is low, and increasing the number of switching operations and a set value of the timing in a constant ratio to the operation frequency and setting an upper limit to the number of switching operations in such a manner that the number of switching operations does not exceed a certain set value when the operation frequency of the inverter is increased.

5 Claims, 8 Drawing Sheets

PWM INVERTER CONTROL METHOD

TECHNICAL FIELD

The present invention relates to a reduction in the noise of a PWM inverter for carrying out the variable speed driving operation and system interconnection of a motor.

BACKGROUND ART

Figure 13:
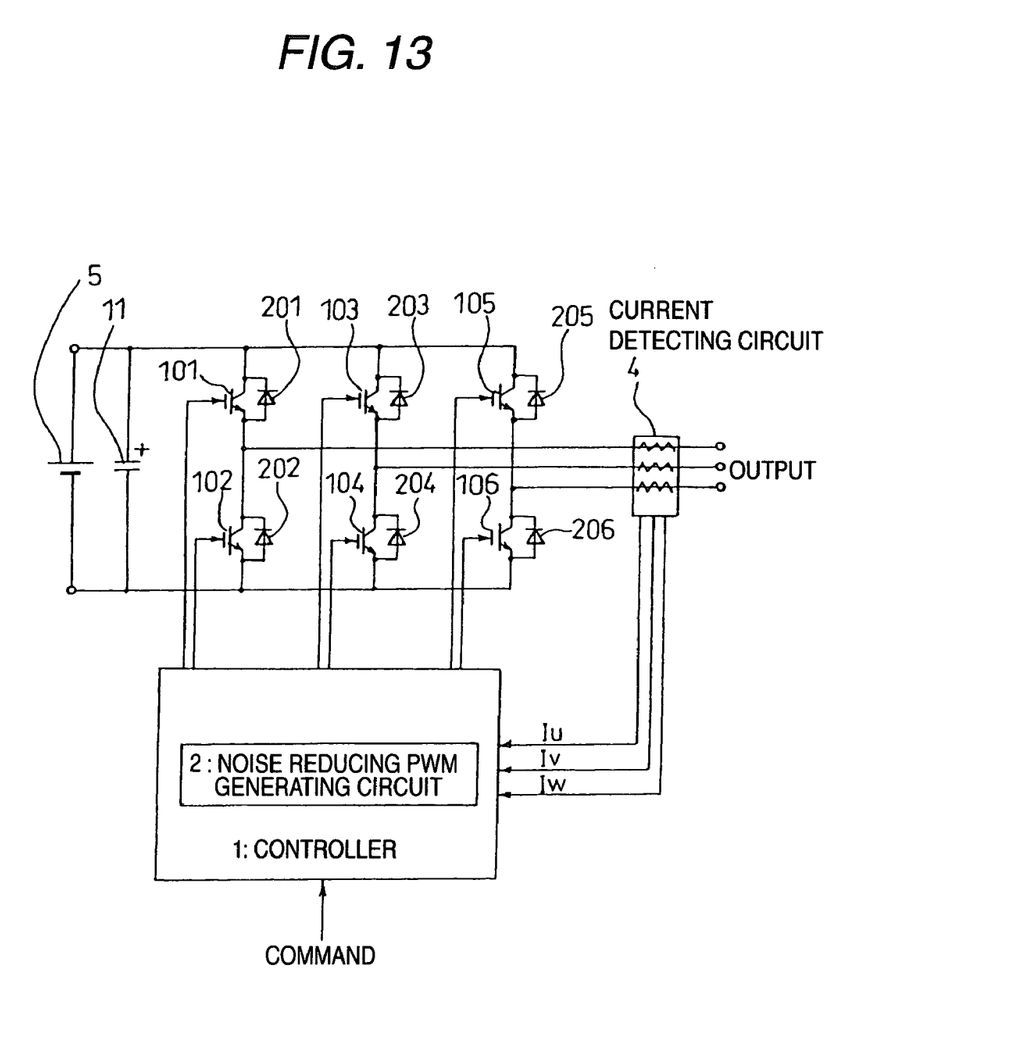
FIG. 13 is a diagram showing an example of the circuit of a conventional PWM inverter device.

FIG. 13 is a diagram showing the structure of a conventional PWM inverter. In FIG. 13, 1 denotes a controller, 2 denotes a noise reducing PWM generating circuit, 4 denotes a current detecting circuit, 5 denotes a DC power supply, 11 denotes a smoothing capacitor, 101 to 106 denote a switching unit, and 201 to 206 denote a free wheel diode.

With the structure described above, a command and a detection value of an output current from the current detecting circuit 4 are input to the controller 1. The controller 1 creates a PWM switching pattern specialized to reduce a noise by the noise reducing PWM generating circuit 2 in response to their inputs and outputs a command for turning ON/OFF a switching unit.

Description will be given to the PWM switching pattern specialized to reduce a noise. A PWM pulse having a 3-phase and 2-level which is output from the circuit shown in FIG. 13 is illustrated in a spatial vector diagram of FIG. 2, and a general PWM pulse pattern is shown in FIG. 3. Each of symbols a, b, Op and On vectors on the spatial vector diagram of FIG. 2 corresponds to the switching pattern of each phase shown in FIG. 3, and H indicates a state in which an upper switching unit is ON and L indicates a state in which a lower switching unit is ON.

Figure 3:
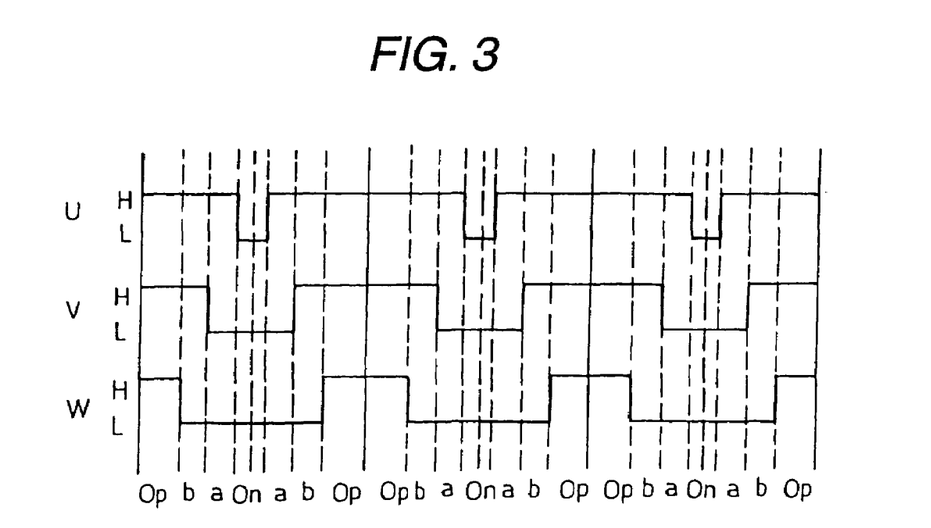
FIG. 3 is a diagram showing the ordinary switching pattern of the inverter illustrated in FIG. 1.
Figure 4:
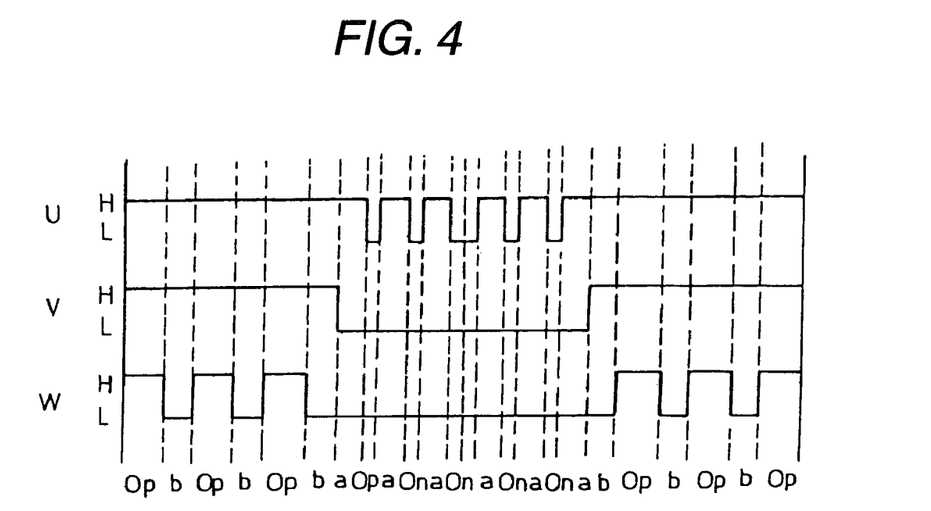
FIG. 4 is a diagram showing a switching pattern obtained by reducing a noise in the pattern illustrated in FIG. 3.

A PWM inverter usually outputs the pattern shown in FIG. 3, and furthermore, outputs a noise reducing pattern shown in FIG. 4 which is obtained by recombining a pulse pattern by the noise reducing PWM generating circuit 2. The noise reducing pattern is equal to the ordinary pattern of FIG. 3 on a time average, and the pulse pattern shown in FIG. 4 in which a pulse is divided, converged and distributed is generated to disperse a noise, whereby a noise reduction can be thus attained.

In the conventional art, however, a normal PWM method uniformly carries out switching for all phases. For this reason, a frequency generating a noise is converged to make an unpleasant noise. If the pulse pattern is complicated based on a noise reducing countermeasure, however, the number of switching operations is considerably increased so that the switching loss of a switching unit is raised and the generation of heat is thus increased. This is a big problem in that an inverter is to be operated safely, and there is a problem in that the lifetime of the switching unit is also influenced.

Therefore, it is an object of the invention to provide a PWM inverter control method capable of freely setting the switching of each of phases, in which the peaks of their noises are dispersed, and furthermore, the number of switching operations is provided with a lower limit value and an upper limit value to reduce a switching loss to be equal to or smaller than a set value so that a noise reducing countermeasure and energy saving can be consistent with each other.

DISCLOSURE OF THE INVENTION

In order to attain the object, a first aspect of the invention is directed to a PWM inverter control method of a 2-level PWM control type which has a function of freely changing switching of switching units connected in series every set in a structure in which two switches including a switching unit and a rectifying unit connected in antiparallel are serially connected in plural sets, wherein the switching of the switching units connected in series is limited by setting the number of switching operations and a timing to output an optional voltage in order not to converge a frequency component of a noise caused by the switching and setting a lower limit to the number of switching operations in order to prevent the number of switching operations from being excessively decreased in that case when an operation frequency of an inverter is low, and increasing the number of switching operations and a set value of the timing in a constant ratio to the operation frequency and setting an upper limit to the number of switching operations in such a manner that the number of switching operations does not exceed a certain set value when the operation frequency of the inverter is increased.

According to the PWM inverter control method, in a 2-level PWM inverter control method capable of freely setting the switching of each phase, the peak of a noise is dispersed and the number of switching operations is provided with an upper limit value and a lower limit value and is thus limited. Consequently, it is also possible to reduce an unpleasant noise and to suppress a switching loss.

Moreover, a second aspect of the invention is directed to a PWM inverter control method of a multilevel PWM control type which has a function of freely changing switching of switching units connected in series every set and outputs a PWM pulse having at least three output levels in a structure in which at least four even-numbered switches including a switching unit and a rectifying unit connected in antiparallel are serially connected in plural sets, wherein the switching of the switching units connected in series is limited by setting the number of switching operations and a timing to output an optional voltage in order not to converge a frequency component of a noise caused by the switching and setting a lower limit to the number of switching operations in order to prevent the number of switching operations from being excessively decreased in that case when an operation frequency of an inverter is low, and increasing the number of switching operations and a set value of the timing in a constant ratio to the operation frequency and setting an upper limit to the number of switching operations in such a manner that the number of switching operations does not exceed a certain set value when the operation frequency of the inverter is increased.

According to the PWM inverter control method, in a 3-level PWM inverter control method, the peak of a noise is dispersed and the number of switching operations is provided with an upper limit value and a lower limit value and is thus limited. Consequently, it is also possible to reduce an unpleasant noise and to suppress a switching loss.

Furthermore, a third aspect of the invention is directed to the PWM inverter control method according to the first or second aspect of the invention, wherein an upper limit value of the number of switching operations is set in such a manner that a time average of a switching loss generated by the switching unit is equal to or smaller than a certain set value.

In the PWM inverter control method, the upper limit value of a switching number limitation is set in such a manner that the time average of the switching loss is equal to or smaller than the set value. By setting the switching loss to be the amount of control, consequently, it is possible to fix the upper limit value of the number of switching operations to carry out the control.

Moreover, a fourth aspect of the invention is directed to the PWM inverter control method according to the first or second aspect of the invention, wherein an upper limit value of the number of switching operations is set in such a manner that generation of heat of a PWM inverter is equal to or smaller than a certain set value.

In the PWM inverter control method, the upper limit value of the switching number limitation is set in such a manner that the generation of heat of the inverter is equal or smaller than the set value. By setting the amount of generated heat to be the amount of control, consequently, it is possible to fix the upper limit value of the number of switching operations to carry out the control.

In addition, a fifth aspect of the invention is directed to the PWM inverter control method according to any of the first to fourth aspects of the invention, wherein a frequency of the number of switching operations to be set is skipped in such a manner that a component of the frequency is not equal to a resonance frequency of a motor connected to an output side.

In the PWM inverter control method, a noise can be reduced and a switching loss can be suppressed through the limitation of the number of switching operations, and furthermore, the vibration of a control system can be controlled and the generation of a mechanical sound can also be reduced through the frequency skip of the resonance frequency band of the motor.

In the drawings, 1 denotes a controller, 2 denotes a noise reducing PWM generating circuit, 3 denotes a switching number limiting circuit, 4 denotes a current detecting circuit, 5 denotes a DC power supply, 11 denotes a smoothing capacitor, 12 and 13 denote a voltage dividing capacitor, 101 to 118 denote a switching unit, 201 to 218 denote a free wheel diode, and 301 to 306 denote a clamp diode.

BEST MODE FOR CARRYING OUT THE INVENTION

A first embodiment of the invention will be described below with reference to the drawings.

Figure 1:
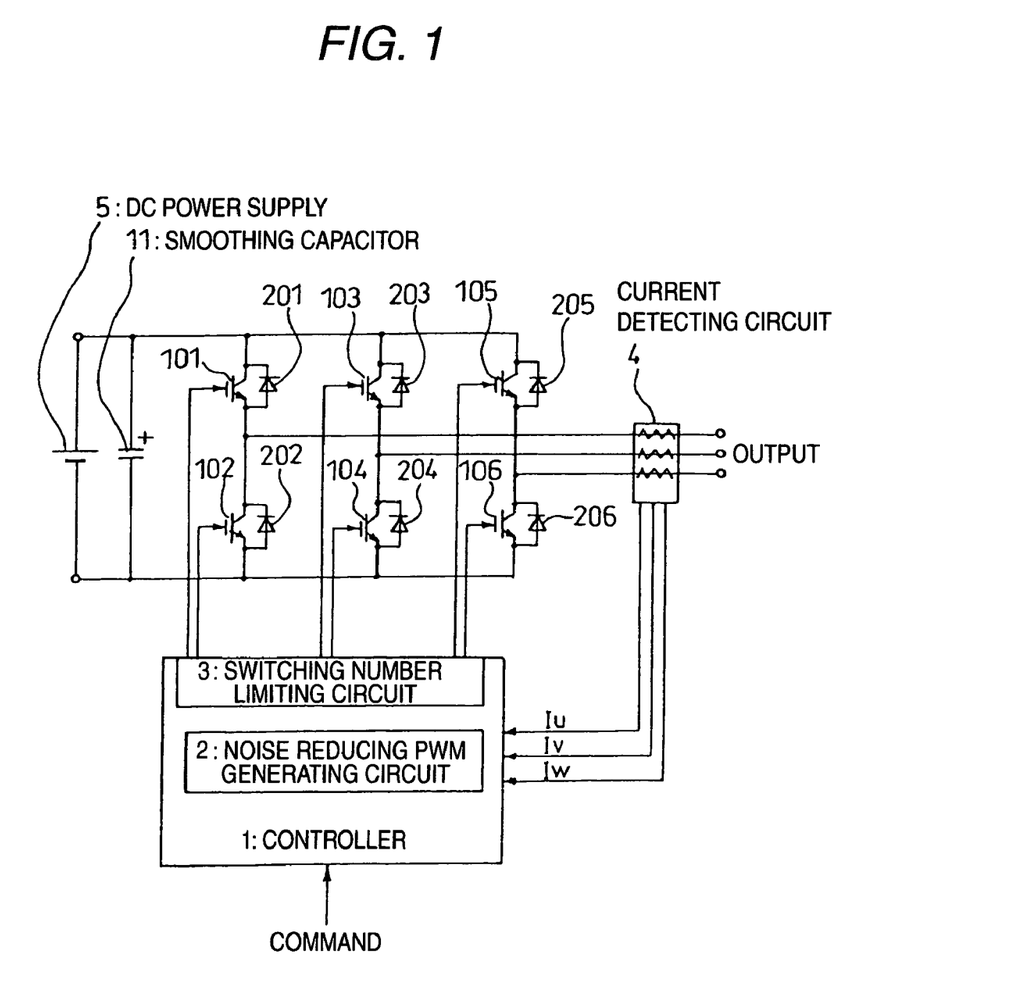
FIG. 1 is a diagram showing an example of a circuit for a PWM inverter control method according to a first embodiment of the invention.

FIG. 1 is a diagram showing an example of a circuit for a PWM inverter control method according to a first embodiment.

Figure 2:
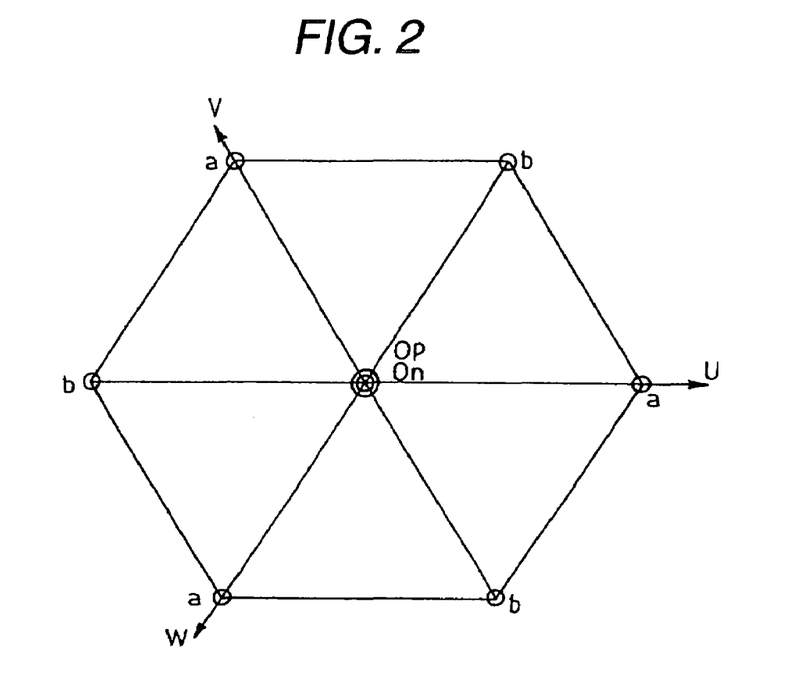
FIG. 2 is a diagram showing the spatial vector of an inverter illustrated in FIG. 1.

FIG. 2 is a diagram showing the spatial vector of an inverter illustrated in FIG. 1.

FIG. 3 is a diagram showing the ordinary switching pattern of the inverter illustrated in FIG. 1.

FIG. 4 is a diagram showing a switching pattern obtained by reducing a noise in the pattern illustrated in FIG. 3.

Figure 5:
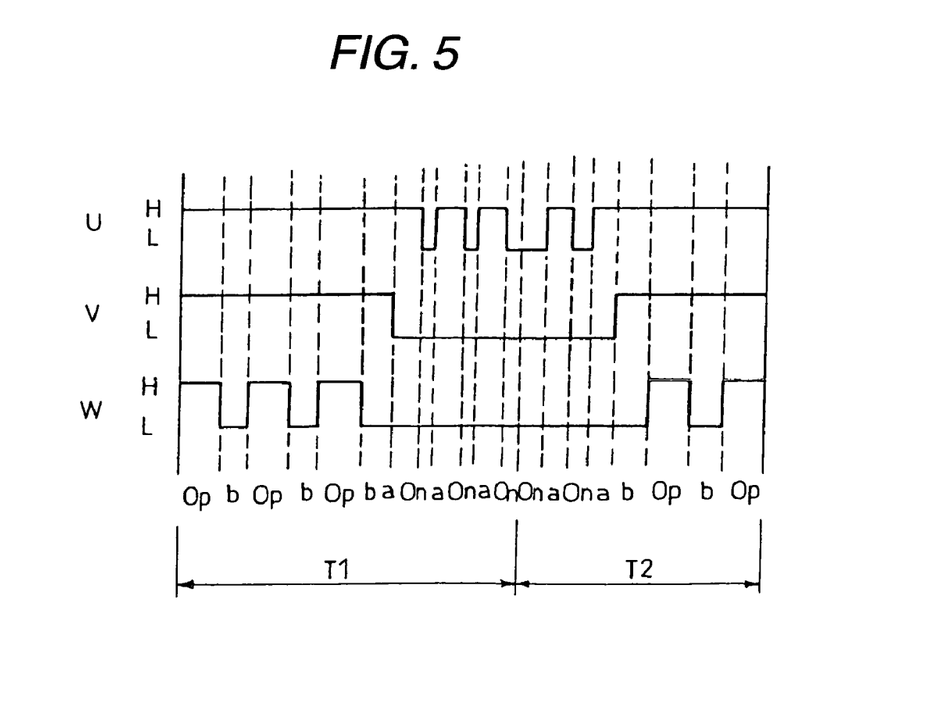
FIG. 5 is a diagram showing a switching pattern subjected to a reduction in a noise and a switching number limitation in the inverter illustrated in FIG. 1.

FIG. 5 is a diagram showing a switching pattern subjected to a reduction in a noise and a switching number limitation in the inverter illustrated in FIG. 1.

Figure 6:
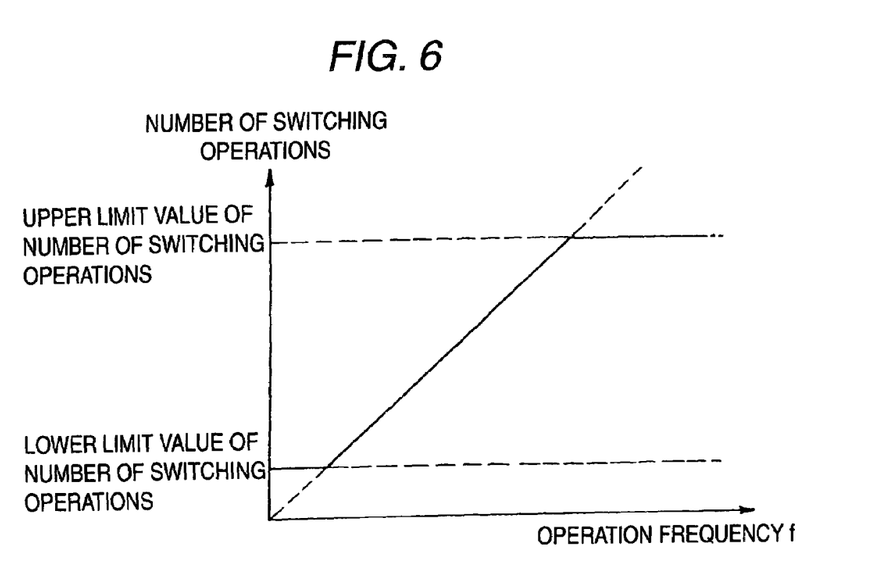
FIG. 6 is a graph representing the switching number limitation shown in FIG. 5.

FIG. 6 is a graph representing the switching number limitation shown in FIG. 5.

Figure 7:
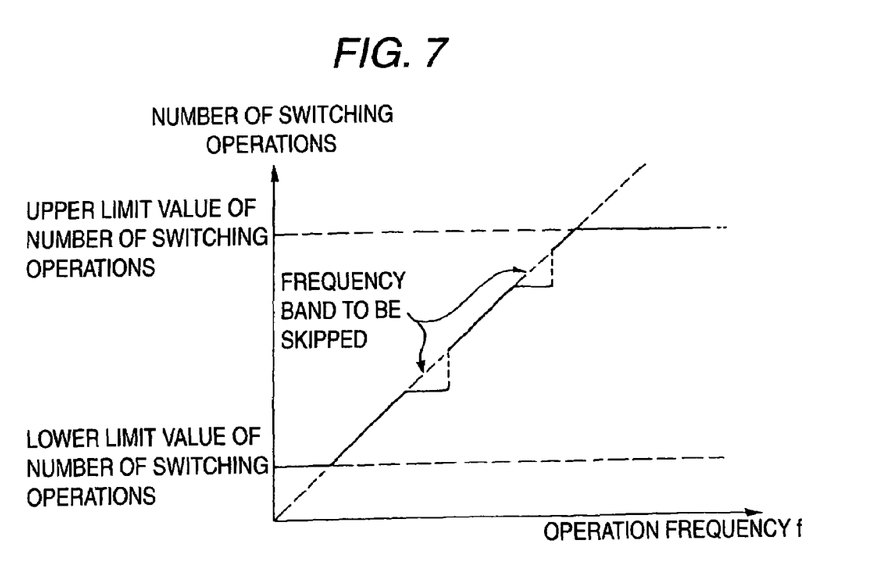
FIG. 7 is a chart showing a skip frequency band in the graph of FIG. 6.

FIG. 7 is a chart showing a skip frequency band in the graph of FIG. 6.

In FIG. 1, 1 denotes a controller, 2 denotes a noise reducing PWM generating circuit, 3 denotes a switching number limiting circuit, 4 denotes a current detecting circuit, 5 denotes a DC power supply, 11 denotes a smoothing capacitor, 101 to 106 denote a switching unit, and 201 to 206 denote a free wheel diode.

Next, an operation will be described.

In a 3-phase and 2-level PWM inverter shown in FIG. 1, when a command is input from the controller 1, a PWM pulse pattern shown in FIG. 3 is created based on a spatial vector shown in FIG. 2 according to the command value. Symbols a, b, Op and On of the spatial vector in FIG. 2 correspond to the switching patterns of phases U, V and W shown in FIG. 3, and H indicates a state in which the upper switching units 101, 103 and 105 are ON, and L indicates a state in which the lower switching units 102, 104 and 106 are ON. The switching units "101 and 102" correspond to the U phase, the switching units "103 and 104" correspond to the V phase, and the switching units "105 and 106" correspond to the W phase.

Subsequently, the PWM pulse pattern is changed to a PWM switching pattern subjected to a reduction in a noise through the noise reducing PWM generating circuit 2. In other cases, switching is uniformly carried out over the U, V and W phases together in FIG. 3. For this reason, a noise output is converged on a specific frequency. In a noise reducing pattern in FIG. 4, however, the average value of a voltage to be output is held to be equal to that in FIG. 3, and at the same time, a pattern is divided and recombined and a frequency is thus regulated in such a manner that a specific frequency (a frequency in an unpleasant voice band) is not output. Description will be given with reference to an example of the U phase. While the uniform pulse of the U phase in FIG. 3 is recombined to a double number of pulses having different pulse widths in the U phase of FIG. 4, it is shifted to be higher and is thus regulated in such a manner that the average value of a total voltage is identical and only a frequency gets out of a voice band by the recombination. Consequently, a noise in the unpleasant voice band is dispersed and reduced.

The switching pattern thus subjected to the reduction in a noise is then input to the switching number limiting circuit 3 to decide whether or not a set number of switching operations is satisfied. In order to suppress the generation of heat which is caused by a switching loss, the switching number limiting circuit 3 sets a limit in such a manner that the set number of switching operations is not exceeded. The limit may be set based on the characteristic of a switching unit (an IGBT) in the design of a PWM inverter or may be set by measurement based on the amount of generated heat under the condition of an actual use, and is not set to be a specific fixed value.

In the PWM inverter, the number of switching operations is increased simultaneously with a rise in an operation frequency, and a number limiting function is performed so that more switching is limited as shown in FIG. 6 when the number of switching operations exceeds a set value by the decision of the switching number limiting circuit 3.

More specifically, when the number of switching operations exceeds the set value, the number of divisions of a PWM pattern is decreased on a carrier cycle unit or a dispersing method is changed to carry out a regulation in order to reduce the number of switching operations in such a manner that the number of switching operations on a time average is maintained to be constant in the noise reducing PWM generating circuit 2.

For example, FIG. 5 shows a noise reducing pattern subjected to the switching number limitation, in which a period T1 is the same as that in the pulse pattern shown in FIG. 4 and the number of switching operations is limited to decrease pulses when a cycle is changed from T1 to T2 so that an operation frequency is increased. In this case, referring to the number of switching operations every control period, the number is 11 for the period T1 which is the same as that in FIG. 4 and the number is reduced to be seven for the period T2. However, the number of switching operations is almost equalized on a total time average and the tire average of a switching loss is maintained to be equal to or smaller than a set value so that the generation of heat of the switching unit can be suppressed.

When the number of switching operations is too small, moreover, a great ripple is generated over a current to be output, which becomes a problem. As shown in FIG. 6, therefore, the lower limit value of the number of switching operations is set by the switching number limiting circuit 3 (which is also set by a characteristic value) and a limit is set in such a manner that the number of switching operations is not smaller than the lower limit value.

As shown in FIG. 7, furthermore, the number of switching operations is subjected to a skip processing as the processing of the switching number limiting circuit 3 in such a manner that the resonance frequency of a motor to be connected as a load is not coincident with the number of switching operations of a PWM pulse pattern to be output.

By skipping the number of switching operations in order not to output the resonance frequency, thus, it is possible to suppress a vibration to control the generation of a mechanical sound, and furthermore, to achieve a stable reduction in a noise.

Next, a second embodiment of the invention will be described with reference to the drawings.

Figure 8:
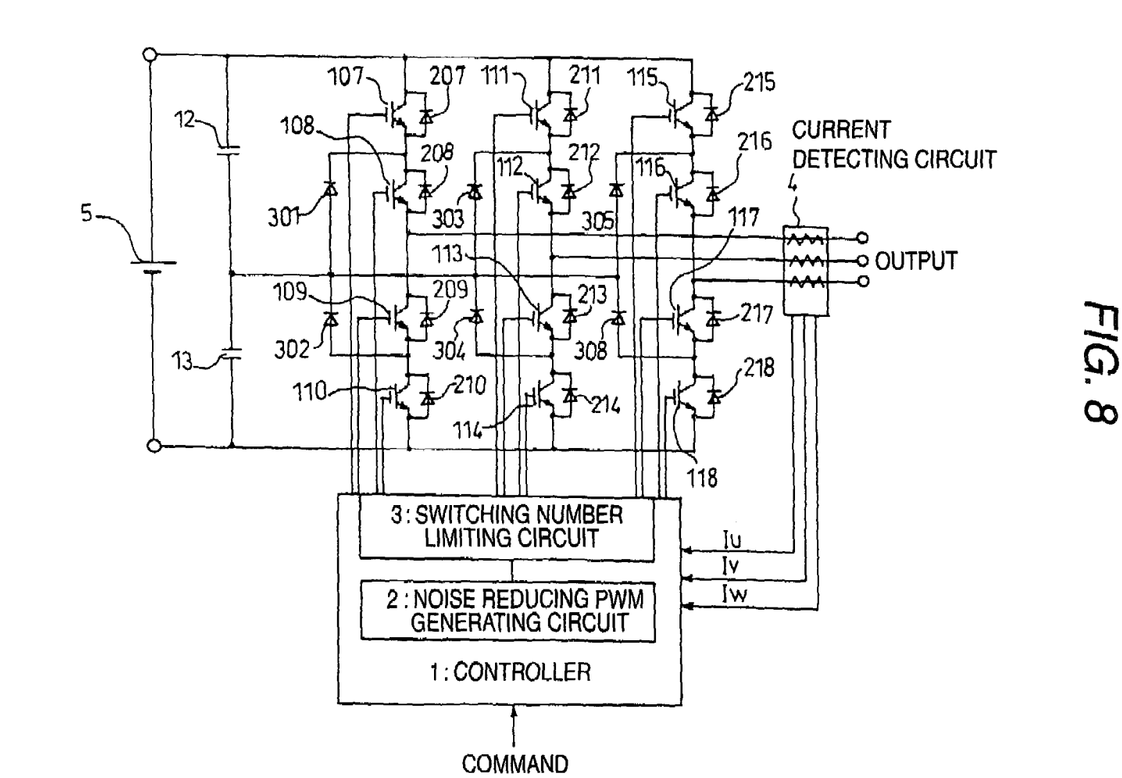
FIG. 8 is a diagram showing an example of a circuit for a PWM inverter control method according to a second embodiment of the invention.

FIG. 8 is a diagram showing an example of a circuit for a PWM inverter control method according to the second embodiment.

Figure 9:
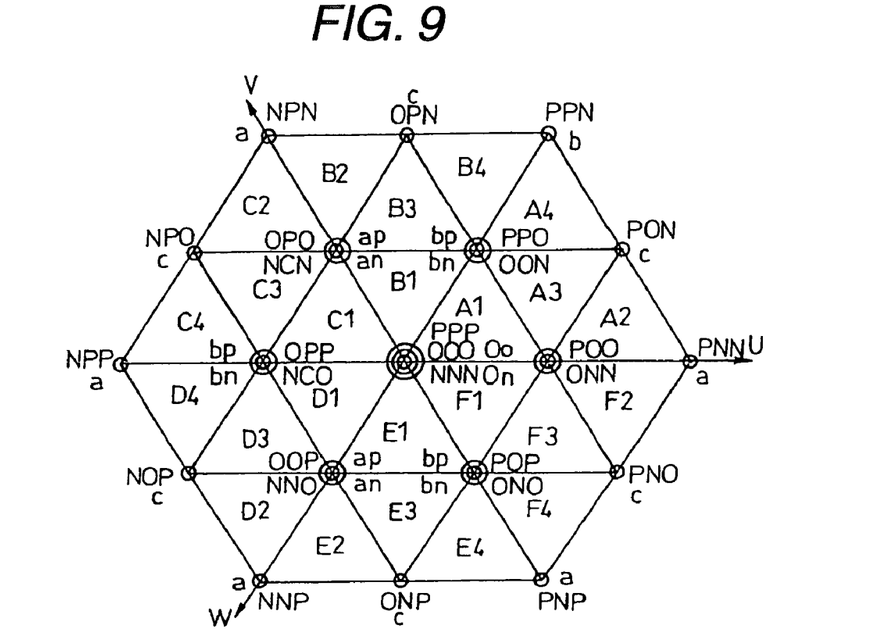
FIG. 9 is a diagram showing the spatial vector of an inverter illustrated in FIG. 8.

FIG. 9 is a diagram showing the spatial vector of an inverter illustrated in FIG. 8.

Figure 10:
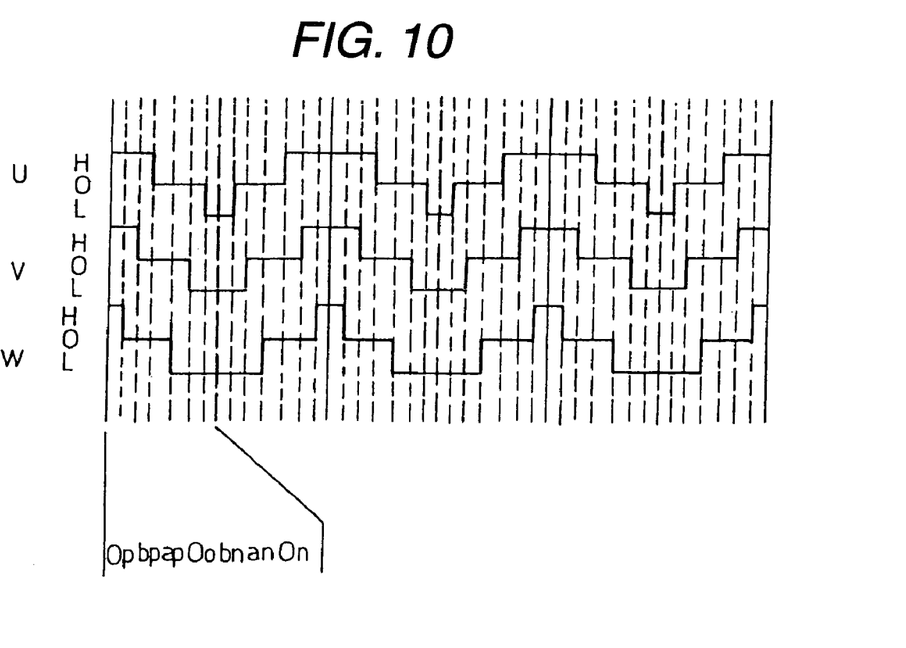
FIG. 10 is a diagram showing the ordinary switching pattern of the inverter illustrated in FIG. 8.

FIG. 10 is a diagram showing the ordinary switching pattern of the inverter illustrated in FIG. 8.

Figure 11:
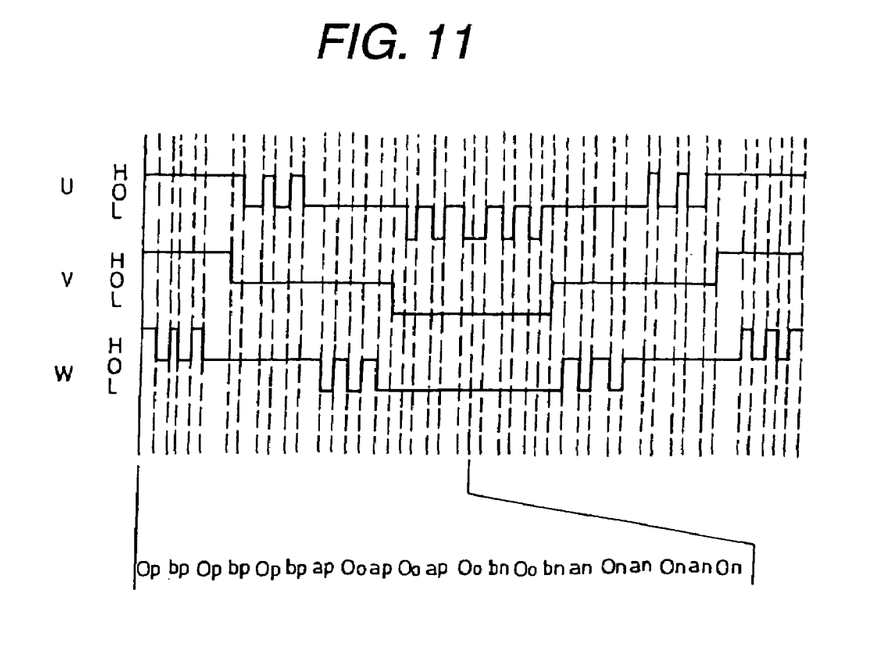
FIG. 11 is a diagram showing a switching pattern obtained by reducing a noise in the pattern illustrated in FIG. 10.

FIG. 11 is a diagram showing a switching pattern obtained by reducing a noise in the pattern illustrated in FIG. 10.

Figure 12:
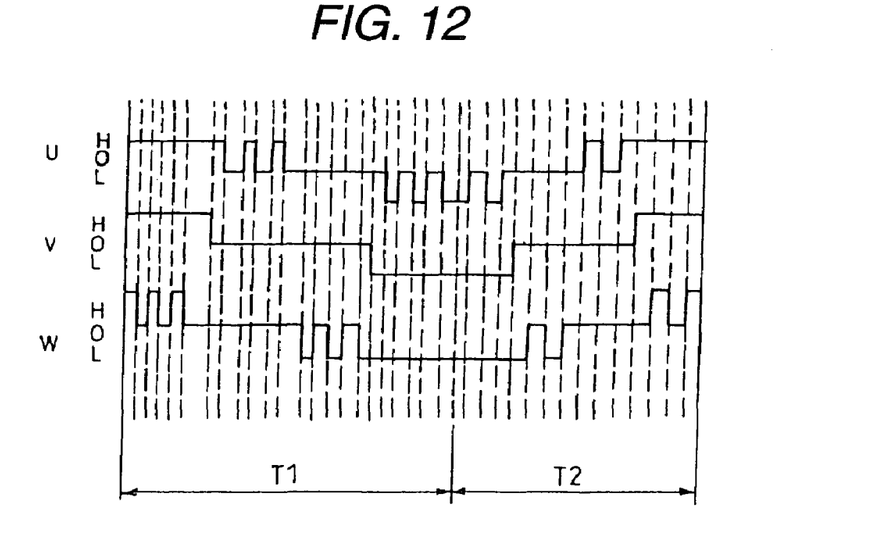
FIG. 12 is a diagram showing a switching pattern subjected to a reduction in a noise and a switching number limitation in the inverter illustrated in FIG. 8.

FIG. 12 is a diagram showing a switching pattern subjected to a reduction in a noise and a switching number limitation in the inverter illustrated in FIG. 8.

FIG. 8 shows an example in which the invention is applied to a 3-phase and 3-level inverter, in which 1 denotes a controller, 2 denotes a noise reducing PWM generating circuit, 3 denotes a switching number limiting circuit, 4 denotes a current detecting circuit, 5 denotes a DC power supply, 12 and 13 denote a smoothing capacitor, 107 to 118 denote a switching unit (the switching units 107 to 110 correspond to a U phase, the switching units 111 to 114 correspond to a V phase, and the switching units 115 to 118 correspond to a W phase), 201 to 206 denote a free wheel diode, and 301 to 306 denote a clamp diode for an intermediate level output.

Next, an operation will be described.

Also in the case in which a 3-level NPC inverter shown in FIG. 8 is used, a PWM pulse which can be output is represented in a spatial vector diagram as shown in FIG. 9, and a general pulse pattern using the same is shown in FIG. 10. Each of symbols a, b, ap, an, bp, bn, Op, On and Oo of a spatial vector corresponds to the switching pattern of each phase shown in FIG. 10, and H indicates a state in which an upper switching unit is ON, O indicates a state in which two middle switching units for outputting a neutral voltage that is capacitor divided are ON, and L indicates a state in which a lower switching unit is ON.

Usually, the uniform pattern shown in FIG. 10 is output, and is changed to a PWM switch pattern subjected to a reduction in a noise shown in FIG. 11 by the noise reducing PWM generating circuit 2. The noise reducing PWM pattern is equal to the normal uniform pattern shown in FIG. 10 on the time average of a voltage, and a pulse is divided and converged or dispersed to generate the noise reducing pattern shown in FIG. 11. Thus, a noise is dispersed so that the reduction in the noise can be implemented.

In the same manner as in the embodiment, next, the limit of the number of times shown in FIG. 6 is set by the switching number limiting circuit 3 in such a manner that a set number of switching operations is not exceeded in order to suppress the generation of heat by a switching loss, and a switching number limiting pattern shown in FIG. 12 is generated from the noise reducing pattern shown in FIG. 11. In the example of FIG. 12, a period T1 has the same number of times as that of FIG. 11, and the number of switching operations is decreased so that the number of divisions of a pulse is reduced for a period T2 in which an operation frequency is increased to limit the number of switching operations.

Even if the operation frequency is more increased, accordingly, it is possible to maintain the number of switching operations which is subjected to a time average, to prevent a rise in the switching loss and to safely implement a reduction in a noise by decreasing the number of divisions of the PWM pattern or changing a dispersing method.

Also in the second embodiment, the skip processing shown in FIG. 7 may be carried out.

While the invention has been described in detail with reference to specific embodiments, it is apparent to the skilled in the art that various changes and modifications can be made without departing from the spirit and scope of the invention.

The application is based on Japanese Patent Application (JP-A-2002-171395) filed on Jun. 12, 2002, and contents thereof are incorporated by reference.

INDUSTRIAL APPLICABILITY

As described above, according to the invention, it is possible to produce an advantage that a reduction in a noise can be obtained by recombining the switch pattern of each phase to disperse the peak of the noise and the reduction in the noise and energy saving can be consistent with each other by providing a lower limit value and an upper limit value on the number of switching operations to decrease a switching loss to be equal to or smaller than a set value in a PWM inverter control method capable of freely setting the switching of each phase.

The invention claimed is:

1. A PWM inverter control method of a 2-level PWM control type which has a function of freely changing switching of switching units connected in series every set in a structure in which two switches including a switching unit and a rectifying unit connected in antiparallel are serially connected in plural sets, wherein the switching of the switching units connected in series is limited by setting the number of switching operations and a timing to output an optional voltage in order not to converge a frequency component of a noise caused by the switching and setting a lower limit to the number of switching operations in order to prevent the number of switching operations from being excessively decreased in that case when an operation frequency of an inverter is low, and increasing the number of switching operations and a set value of the timing in a constant ratio to the operation frequency and setting an upper limit to the number of switching operations in such a manner that the number of switching operations does not exceed a certain set value when the operation frequency of the inverter is increased.

2. A PWM inverter control method of a multilevel PWM control type which has a function of freely changing switching of switching units connected in series every set and outputs a PWM pulse having at least three output levels in a structure in which at least four even-numbered switches including a switching unit and a rectifying unit connected in antiparallel are serially connected in plural sets, wherein the switching of the switching units connected in series is limited by setting the number of switching operations and a timing to output an optional voltage in order not to converge a frequency component of a noise caused by the switching and setting a lower limit to the number of switching operations in order to prevent the number of switching operations from being excessively decreased in that case when an operation frequency of an inverter is low, and increasing the number of switching operations and a set value of the timing in a constant ratio to the operation frequency and setting an upper limit to the number of switching operations in such a manner that the number of switching operations does not exceed a certain set value when the operation frequency of the inverter is increased.

3. The PWM inverter control method according to claim 1 or 2, wherein an upper limit value of the number of switching operations is set in such a manner that a time average of a switching loss generated by the switching unit is equal to or smaller than a certain set value.

4. The PWM inverter control method according to claim 1 or 2, wherein an upper limit value of the number of switching operations is set in such a manner that generation of heat of a PWM inverter is equal to or smaller than a certain set value.

5. The PWM inverter control method according to any of claim 1 or 2, wherein a frequency of the number of switching operations to be set is skipped in such a manner that a component of the frequency is not equal to a resonance frequency of a motor connected to an output side.

* * * * *